N. E. MORGAN.
SPRAYING DEVICE.
APPLICATION FILED DEC. 13, 1915.
1,206,128. Patented Nov. 28, 1916.
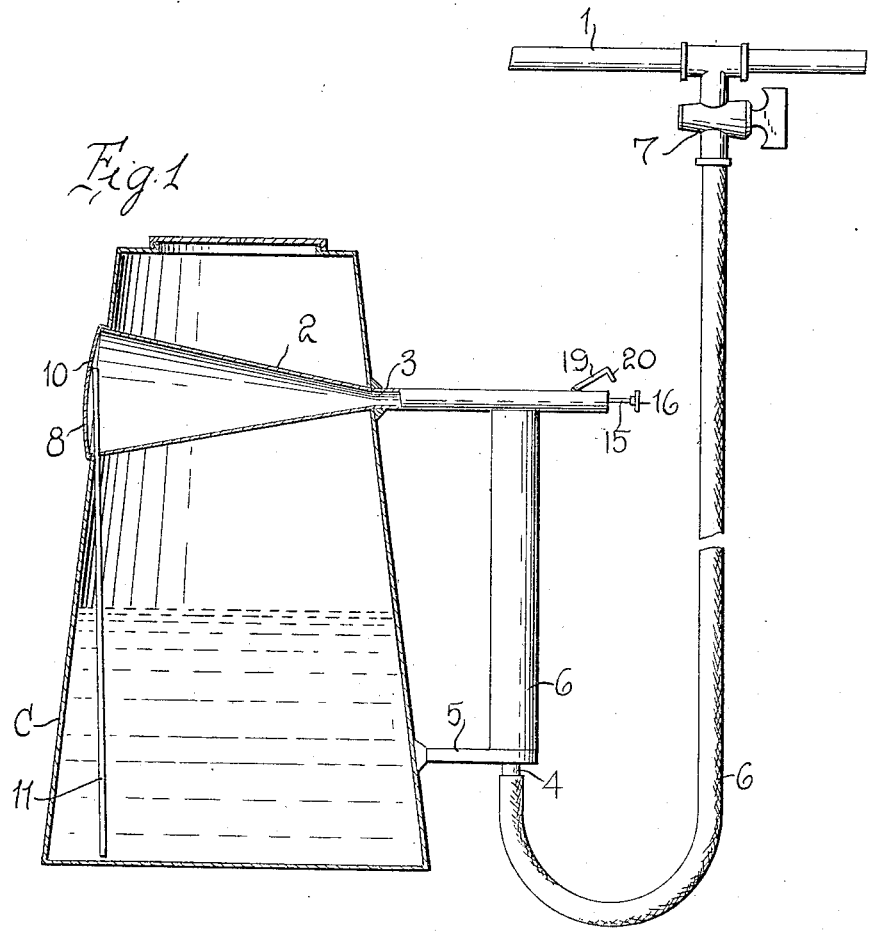
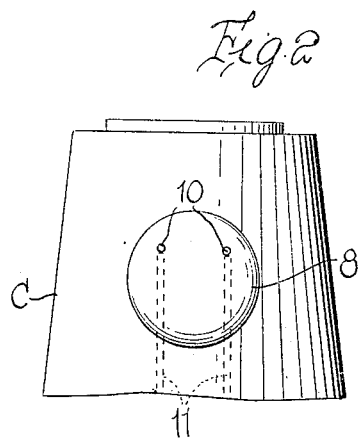
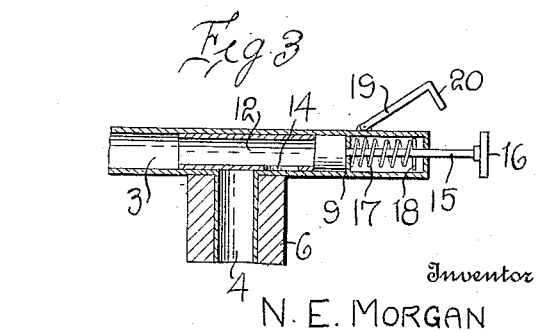
Inventor
N. E. MORGAN
By Watson E. Coleman
Attorney

UNITED STATES PATENT OFFICE.

NEIL E. MORGAN, OF HERMON, NEW YORK.

SPRAYING DEVICE.

1,206,128.  Specification of Letters Patent.  Patented Nov. 28, 1916.

Application filed December 13, 1915. Serial No. 66,609.

*To all whom it may concern:*

Be it known that I, NEIL E. MORGAN, a citizen of the United States, residing at Hermon, in the county of St. Lawrence and State of New York, have invented certain new and useful Improvements in Spraying Devices, of which the following is a specification, reference being had to the accompanying drawings.

This invention relates to certain improvements in spraying devices and has relation more particularly to a device of this general character especially designed and adapted for use in connection with cattle or the like; and it is an object of the invention to provide a sprayer of novel and improved construction whereby the insecticide or repellent is deposited upon the animal in a very fine spray so that the possibility of blistering or otherwise injuring the animal is eliminated.

Furthermore, it is an object of the invention to provide a novel and improved sprayer operable under the influence of air under pressure and whereby the device is capable of ready and convenient manipulation.

The invention consists in the details of construction and in the combination and arrangement of the several parts of my improved spraying device whereby certain important advantages are attained and the device is rendered simpler, less expensive and otherwise more convenient and advantageous for use, all as will be hereinafter more fully set forth.

The novel features of the invention will be carefully defined in the appended claims.

In order that my invention may be the better understood, I will now proceed to describe the same with reference to the accompanying drawings, wherein—

Figure 1 is a view, partly in section and partly in elevation, illustrating a spraying device constructed in accordance with an embodiment of my invention; Fig. 2 is a fragmentary view in elevation of the device as herein embodied; and Fig. 3 is an enlarged fragmentary sectional view illustrating in detail the mechanism, as herein embodied, for controlling the flow of the air under pressure through the air chamber.

As disclosed in the accompanying drawings, 1 denotes a pipe or conduit leading from a suitable source of air under pressure and which may be supported from the ceiling of a barn or the like, although I make no claim as to the particular location of this pipe or conduit. The source of air supply may be as desired.

As herein set forth, my sprayer proper comprises a container C preferably in the form of a truncated cone and having its upper end provided with a removable cover so that the requisite disinfecting liquid may be placed therein. Disposed transversely of the container C adjacent its upper end is a substantially cone-shape member 2 affording an air chamber and having its smaller end extended outwardly, as at 3, and in communication with the tubular member 4 disposed longitudinally of the container, the lower end of the member 4 having coacting therewith the brace member 5 for securing the same in a fixed position relative to the container 1. The tubular member 4 intermediate the brace 5 and the extended portion 3 is surrounded by the sleeve 6 preferably of wood whereby the container may be readily manipulated by a hand of the user.

The lower end of the tubular member 4 has suitably secured thereto the flexible tubing 6 which is in communication with the conduit or container 1 and the flow through said flexible tubing is under control of the stop cock 7 of any ordinary or preferred construction. The larger end of the member 2 extends exteriorly of the container C and is permanently closed by the cap 8, said cover being preferably convex and having produced therein the transversely alined openings 10 through which the air delivered within the member 2 is adapted to escape. Arranged within the container 1 are the longitudinally directed tubes 11 having their lower ends terminating above but closely adjacent the bottom of the container and their upper ends terminating immediately below the openings 10 so that as the air is discharged through the openings 10 the liquid within the container C will be drawn upwardly through the tubes 11 and discharged with the air in a very fine spray, throwing the spray out evenly and forcefully.

It is to be noted that the openings 10 are so disposed relative to the upper ends of the tubes 11 as to cause the air discharging through the openings to pass straight across the upper open ends of the tubes.

The extension 3 has slidably mounted therein the sleeve 12 provided with an opening 14 adapted to register with the upper end of the tubular member 4 when the sleeve 12 is at the limit of its inward movement, and the outer end of the sleeve 12 is provided with a stem 15 which extends exteriorly of the extension 3 through the outer end thereof and terminates in the head 16 adapted to be pressed by the thumb of the hand engaged with the handle 6 so that the opening 14 of the sleeve 12 may be brought into register with the upper end of the tubular member 4.

The sleeve 12 is normally maintained in a position to close the upper end of the tubular member 4 through the medium of the expansible member 17, herein disclosed as a conventional spring, surrounding the stem 15 and interposed between a stop member 9 in the extension 3 and the stop member 18 carried by the stem. The extension 3 has pivotally engaged therewith the clamp member 19 substantially L-shape in form, the foot 20 of which being adapted to overlie the head 16 when the sleeve 11 is at the limit of its inward movement so that said sleeve may be maintained in such position without the necessity of the thumb or other digit of a hand being in engagement with the head.

In practice, I have found that my improved spraying device operates with advantage with the pressure of the air between five pounds and twenty pounds, although I do not wish to be understood as limiting myself in this respect. I also wish to state that if desired a reducing valve may be employed in connection with the flexible tubing 6 in the event that the air pressure within the conduit or pipe 1 is in excess of the pressure desired to be employed in connection with my improved spraying device. In using my sprayer, it is to be understood that the flexible tubing 6 is of such a length as to permit a thorough application of the disinfectant or repellent upon all parts of the animal and I find it of particular advantage to have the tubing 6 about twelve feet in length.

From the foregoing description, it is thought to be obvious that a spraying device constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:—

1. A spraying device of the character described comprising a container, an air chamber disposed therethrough and provided with a discharge opening, a tube extending longitudinally of the container and terminating at one end within the container adjacent the bottom thereof, the opposite end of the tube terminating below and adjacent the discharge opening of the air chamber, said chamber being provided with an extension extending exteriorly of the container, a handle member coacting with the container and extension of the air chamber and provided with a passage-way in communication with the extension of the air chamber at a point intermediate the length thereof, a sleeve mounted for sliding movement within the extension of the air chamber and having its outer end closed, said sleeve intermediate its length being provided with an opening adapted to communicate with the air passage of the handle member upon inward movement of the sleeve, automatic means for normally holding the sleeve at the limit of its outward movement with the opening therein out of register with the air passage of the handle member, and manually operated means for imparting inward movement to the sleeve to bring the opening thereof in register with the air passage of the handle member.

2. A spraying device of the character described comprising a container, an air chamber disposed therethrough and provided with a discharge opening, a tube extending longitudinally of the container and terminating at one end within the container adjacent the bottom thereof, the opposite end of the tube terminating below and adjacent the discharge opening of the air chamber, said chamber being provided with an extension extending exteriorly of the container, a handle member coacting with the container and extension of the air chamber and provided with a passage-way in communication with the extension of the air chamber at a point intermediate the length thereof, a sleeve mounted for sliding movement within the extension of the air chamber and having its outer end closed, said sleeve intermediate its length being provided with an opening adapted to communicate with the air passage of the handle member upon inward movement of the sleeve, automatic means for normally holding the sleeve at the limit of its outward movement with the opening therein out of register with the air passage of the handle member, manually operated means for imparting inward movement to the sleeve to bring the opening thereof in register with the air passage of the handle member, and means connected with the manually operated means for holding the sleeve in its last named position.

In testimony whereof I hereunto affix my signature in the presence of two witnesses.

NEIL E. MORGAN.

Witnesses:
H. L. WALLACE,
JAS. E. ROBINSON.